(12) United States Patent
Bouwmeester

(10) Patent No.: US 10,836,119 B2
(45) Date of Patent: Nov. 17, 2020

(54) METHOD FOR PREPARING A FIBER-REINFORCED ARTICLE HAVING A 3D PRINTED SURFACE LAYER

(71) Applicant: FIBERNEERING TECHNOLOGY DEVELOPMENT B.V., Zwolle (NL)

(72) Inventor: Jasper Gerrit Hendrik Bouwmeester, Zwolle (NL)

(73) Assignee: FIBERNEERING TECHNOLOGY DEVELOPMENT B.V., Zwolle (NL)

( * ) Notice: Subject to any disclaimer, the term of this patent is extended or adjusted under 35 U.S.C. 154(b) by 128 days.

(21) Appl. No.: 15/742,091

(22) PCT Filed: Jul. 7, 2016

(86) PCT No.: PCT/NL2016/050496
§ 371 (c)(1),
(2) Date: Jan. 5, 2018

(87) PCT Pub. No.: WO2017/007321
PCT Pub. Date: Jan. 12, 2017

(65) Prior Publication Data
US 2018/0194083 A1     Jul. 12, 2018

(30) Foreign Application Priority Data

Jul. 7, 2015   (NL) ...................................... 2015101

(51) Int. Cl.
*B29C 70/30* (2006.01)
*B29C 70/54* (2006.01)
(Continued)

(52) U.S. Cl.
CPC .............. *B29C 70/30* (2013.01); *B28B 1/001* (2013.01); *B29C 37/0078* (2013.01);
(Continued)

(58) Field of Classification Search
CPC ....... B22F 3/1055; B28B 1/001; B33Y 10/00; B33Y 80/00; B33Y 70/00; B33Y 50/02;
(Continued)

(56) References Cited

U.S. PATENT DOCUMENTS 5,989,664 A   11/1999   Takayama et al.
6,364,986 B1   4/2002   Kieronski

FOREIGN PATENT DOCUMENTS

EP   2 722 531   4/2014

OTHER PUBLICATIONS

CIBATOOL SL5180, Ciba Speciality Chemical Corporation, Material Safety Data Sheet, accessed online, Sep. 24, 2019.*
(Continued)

*Primary Examiner* — Camie S Thompson
(74) *Attorney, Agent, or Firm* — Nixon & Vanderhye P.C.

(57) ABSTRACT

The invention relates to a method for preparing a fiber-reinforced article, having attached to at least part of its surface a layer of a material that is not fiber-reinforced, comprising the steps of 1) preparing a shell via an additive manufacturing technique, the shell—being of a material that is not fiber-reinforced; and—having a surface that corresponds in negative relief to a surface of the article formed in step 3); thereafter 10 2) applying—long and/or continuous reinforcement fibers; and—a curable resin to the surface of the shell that is in negative relief, to form a mixture of curable resin and long and/or continuous reinforcement fibers on the 1 surface of the shell, so that the surface of the mixture contacting the shell adopts the shape of the surface of the shell that is in negative relief; thereafter 3) curing the curable resin to form the fiber-reinforced article having attached to at least part of its surface a layer of a material that is not 20 fiber-reinforced.

9 Claims, 5 Drawing Sheets

Figure 1:
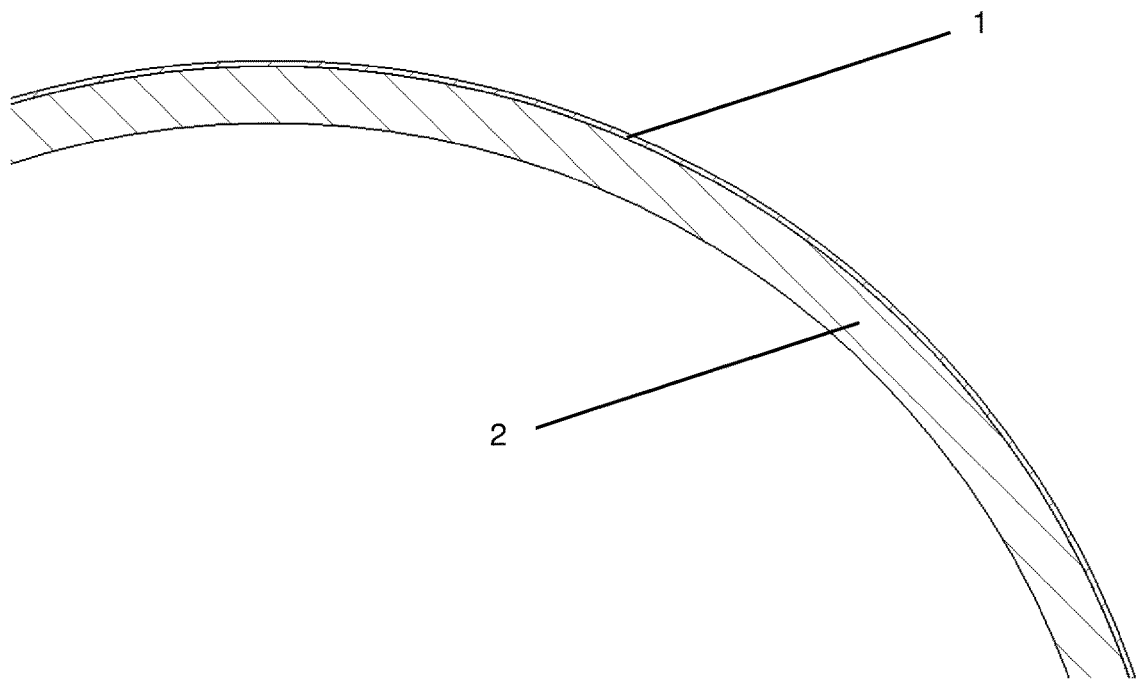

(51) Int. Cl.
| | |
|---|---|
| B29C 37/00 | (2006.01) |
| B29C 70/48 | (2006.01) |
| B29C 70/08 | (2006.01) |
| B33Y 10/00 | (2015.01) |
| B33Y 40/00 | (2020.01) |
| B33Y 70/00 | (2020.01) |
| B33Y 80/00 | (2015.01) |
| B29C 64/10 | (2017.01) |
| B28B 1/00 | (2006.01) |
| B29C 70/16 | (2006.01) |
| B32B 27/20 | (2006.01) |
| B32B 37/14 | (2006.01) |
| B32B 37/15 | (2006.01) |
| B33Y 50/02 | (2015.01) |
| B29C 64/393 | (2017.01) |
| B22F 3/105 | (2006.01) |
| B29L 31/30 | (2006.01) |

(52) U.S. Cl.
CPC ............ *B29C 64/10* (2017.08); *B29C 70/086* (2013.01); *B29C 70/16* (2013.01); *B29C 70/48* (2013.01); *B29C 70/541* (2013.01); *B29C 70/542* (2013.01); *B32B 27/20* (2013.01); *B32B 37/144* (2013.01); *B32B 37/15* (2013.01); *B33Y 10/00* (2014.12); *B33Y 40/00* (2014.12); *B33Y 70/00* (2014.12); *B33Y 80/00* (2014.12); *B22F 3/1055* (2013.01); *B29C 64/393* (2017.08); *B29L 2031/307* (2013.01); *B32B 2305/08* (2013.01); *B32B 2305/10* (2013.01); *B32B 2605/12* (2013.01); *B33Y 50/02* (2014.12)

(58) Field of Classification Search
CPC ... B29C 37/0078; B29C 64/10; B29C 64/393; B29C 70/086; B29C 70/16; B29C 70/20; B29C 70/48; B29C 65/3476; B29C 65/3656; B29C 65/5021; B29C 66/721; B29C 66/72141; B29C 66/73751; B29C 66/73921; B29C 66/742; B32B 2305/09; B32B 2305/10; B32B 37/144; B32B 37/15; Y10T 428/24612; Y10T 428/1393; Y02T 50/43; B29K 2101/12; B29K 2105/06; B29K 2105/24; B29K 2105/243; B29K 2105/246; B29K 2305/00; B29K 2307/00; B21K 25/00
USPC .......... 29/888, 46, 888.046; 428/172, 36.91; 156/285, 295; 264/257, 279, 401, 571
See application file for complete search history.

(56) References Cited

OTHER PUBLICATIONS

International Search Report for PCT/NL2016/050496 dated Oct. 26, 2016, 3 pages.
Written Opinion of the ISA for PCT/NL2016/050496 dated Oct. 26, 2016, 6 pages.

\* cited by examiner

METHOD FOR PREPARING A FIBER-REINFORCED ARTICLE HAVING A 3D PRINTED SURFACE LAYER

This application is the U.S. national phase of International Application No. PCT/NL2016/050496 filed Jul. 7, 2016 which designated the U.S. and claims priority to NL Patent Application No. 2015101 filed Jul. 7, 2015, the entire contents of each of which are hereby incorporated by reference.

The invention relates to a method for preparing a fiber-reinforced article and to an article produced with such method.

Additive manufacturing (AM) is the general name for technologies that build 3D objects by adding layer upon layer of material. AM is commonly known as 3D-printing. The first working AM processes were developed in the nineteen-eighties, which have now delivered AM as the manufacturing revolution of the 21st century. Nowadays, AM is not only used for rapid prototyping by engineers and designers (e.g. parts for cars, boats or aerial vehicles), but it is also used to make niche items in limited edition, such as medical implants, orthopedic aids and personal (hobby) equipment. Serial production of some parts by AM has also been proven successful. Products manufactured by AM can now be found in e.g. aircraft, automotive, shipping, medicine, dentistry, furniture and fashion. Additive manufacturing is considered distinct from traditional machining techniques, which mostly rely on the removal of material by methods such as cutting or drilling (retronymically named subtractive processes).

Unfortunately, not all materials are equally suitable for application in AM. For example, composite materials are difficult to implement in AM because they are a combination of different materials with different properties, having particular mutual interactions and arrangements.

An important class of composite materials is formed by the so-called fiber-reinforced materials. These are materials wherein fibers are incorporated in a matrix material for structural reinforcement. In particular, the implementation of long and/or continuous reinforcement fibers in AM has proven to be a challenge; it proved difficult to achieve fiber alignment required for strength and stiffness purposes, as this is typically different from the printing direction. A conventional method for making a fiber-reinforced material with a particular shape is molding (e.g. resin transfer molding (RTM)). In a molding process, the fibers are transferred to a mold, and resin is introduced for example by injection or infusion, potentially assisted by a vacuum. It is also possible to laminate the resin and the fibers (for example as a pre-impregnated ("prepreg") material) to a first part of the mold and then close the mold by pressing a second part on the first part. After curing in the mold, the shaped product is obtained by opening of the mold.

Such processes, however, obviously require that initially a mold is prepared. A disadvantage of a mold is that its preparation may require quite some effort, energy and materials. Usually, first an exact representation of the final product needs to be made (a plug). Subsequently, a composite mold is often made by applying a gel-coat and several layers of glass reinforcement over the plug. After curing of the required number of glass layers, the mold is released from the plug. Depending on the size and required thickness of the mold, this can be a lengthy process. A mold is therefore usually costly, and its impact on the process costs of a shaped product can only be reduced when a moderately high number of shaped products is prepared from the mold.

A further disadvantage of a mold is that when adjustments in the shape of the product are desired, even small adjustments, either a new mold is required or serious adjustments to the current mold need to be made.

In addition, the shape of molded products is limited by the requirement that the produced product has a releasable shape, i.e. it has to allow release from the mold. For example, a desired product that has undercuts normally cannot be prepared in a mold.

Another example of a limitation of conventional production processes is the preparation of a product that is thin, highly curved and contains a large volume (i.e. a large volume that would have to be removed when product would be prepared by a subtractive process, also known as the minimum bounding box). Such product, e.g. a curved hollow tube, has a shape that is not releasable from a mold, while in a subtractive process the cutting is difficult and generates a lot of waste material.

Also, the filling of a mold by infusion and/or the closing of a mold by pressing together two parts (which is often performed with high force to ensure complete filling of the mold) may cause substantial damage to the fibers such as the interruption of their continuity. This results in a decreased strength of the final product.

Other methods to prepare a fiber-reinforced material are pultrusion, continuous laminating and filament winding. However, these methods usually do not allow the preparation of accurate and/or complex shapes.

It is therefore an objective of the present invention to provide a method wherein a fiber-reinforced material is processed to form an article with a particular shape, without the use of a mold and wherein the shape and the surface of the article can easily and accurately be formed, and/or wherein a post treatment such as cutting, scraping, smoothening, sanding, polishing, or engraving is not necessary or at least used to a smaller extent than in conventional methods.

Composites are not the only type of materials that encounter difficulties in the implementation in AM. A more generally heard problem is that products produced by AM cannot (yet) reach the performance of products produced by other methods. This is in particular the case for the strength and durability. Therefore, the present invention also aims to provide an AM method wherein products can be manufactured that have improved properties such as strength and durability.

It has now been found that one or more of these goals can be reached by applying a particular 3D-printing step in combination with fiber-reinforcement.

Accordingly, the invention relates to a method for preparing a fiber-reinforced article, having attached to at least part of its surface a layer of a material that is not fiber-reinforced, comprising the steps of 1) preparing a shell via an additive manufacturing technique, the shell
   being of a material that is not fiber-reinforced; and
   having a surface that corresponds in negative relief to a surface of the article formed in step 3); thereafter
2) applying
   long and/or continuous reinforcement fibers; and
   a curable resin
   to the surface of the shell that is in negative relief, to form a mixture of curable resin and long and/or continuous reinforcement fibers on the surface of the shell; thereafter
3) curing the curable resin to form the fiber-reinforced article having attached to at least part of its surface a layer of a material that is not fiber-reinforced.

FIG. 1 displays a cross-section of an article produced by a method of the invention.

Figure 2:
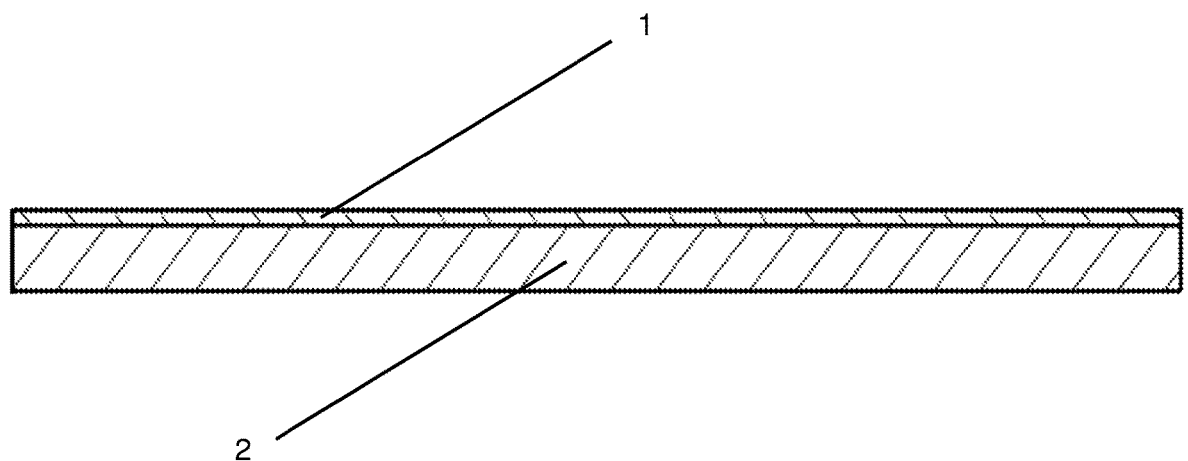

FIG. 2 displays a cross-section of an article produced by a method of the invention.

Figure 3:
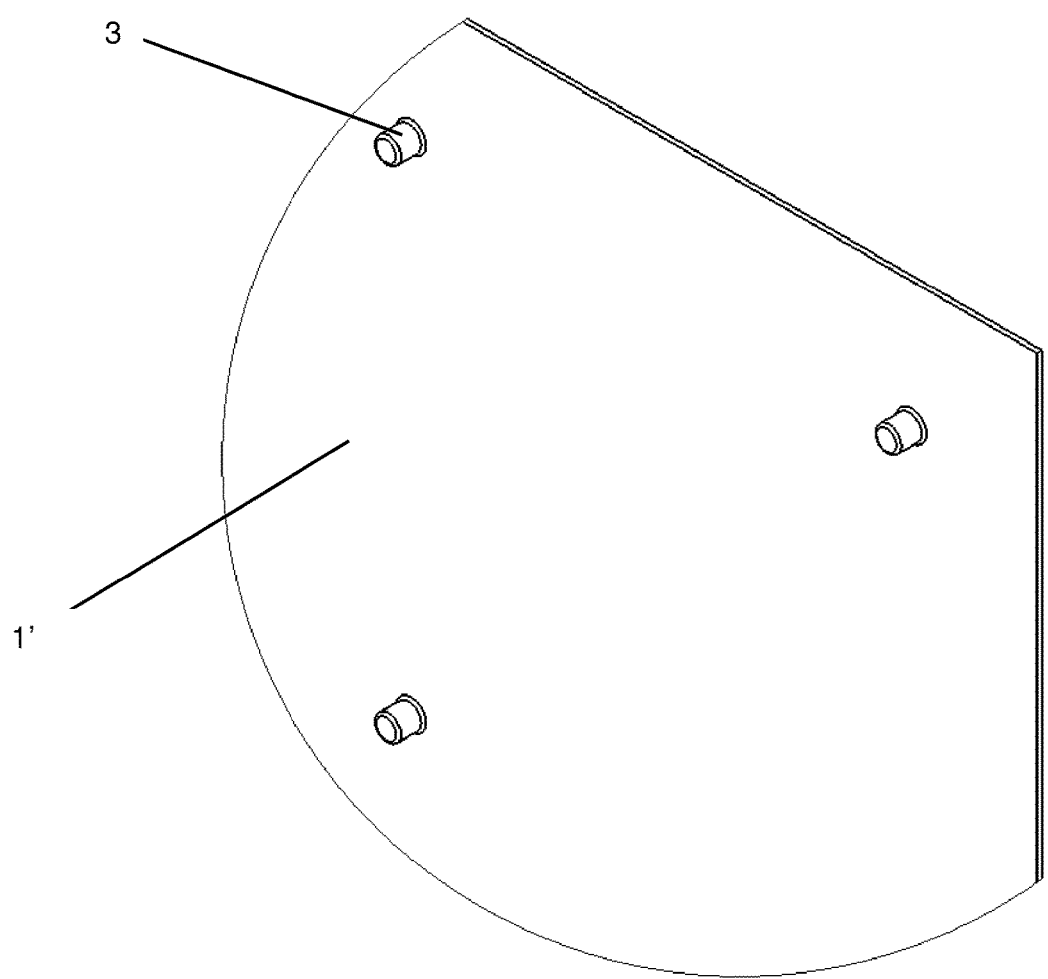

FIG. 3 displays a three-dimensional view of a shell with spacers, which may be used in a method of the invention.

Figure 4:
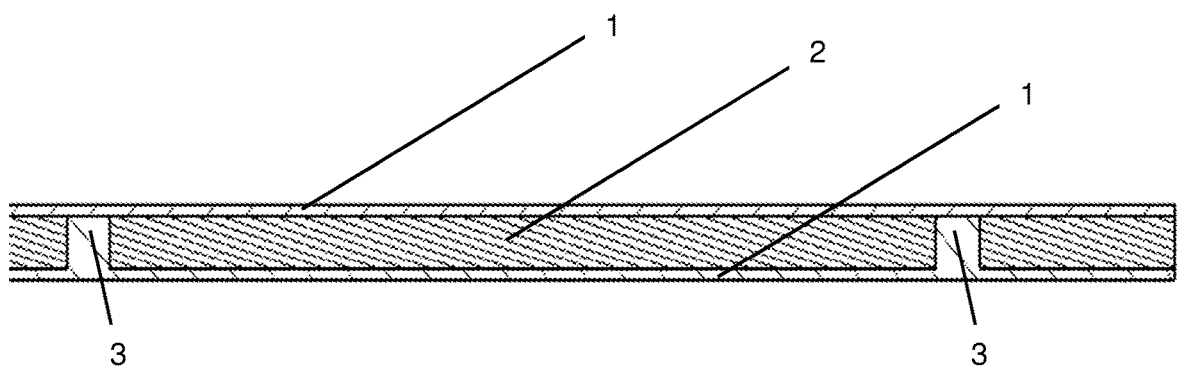

FIG. 4 displays a cross-section of an article produced by a method of the invention, comprising spacers.

Figure 5:
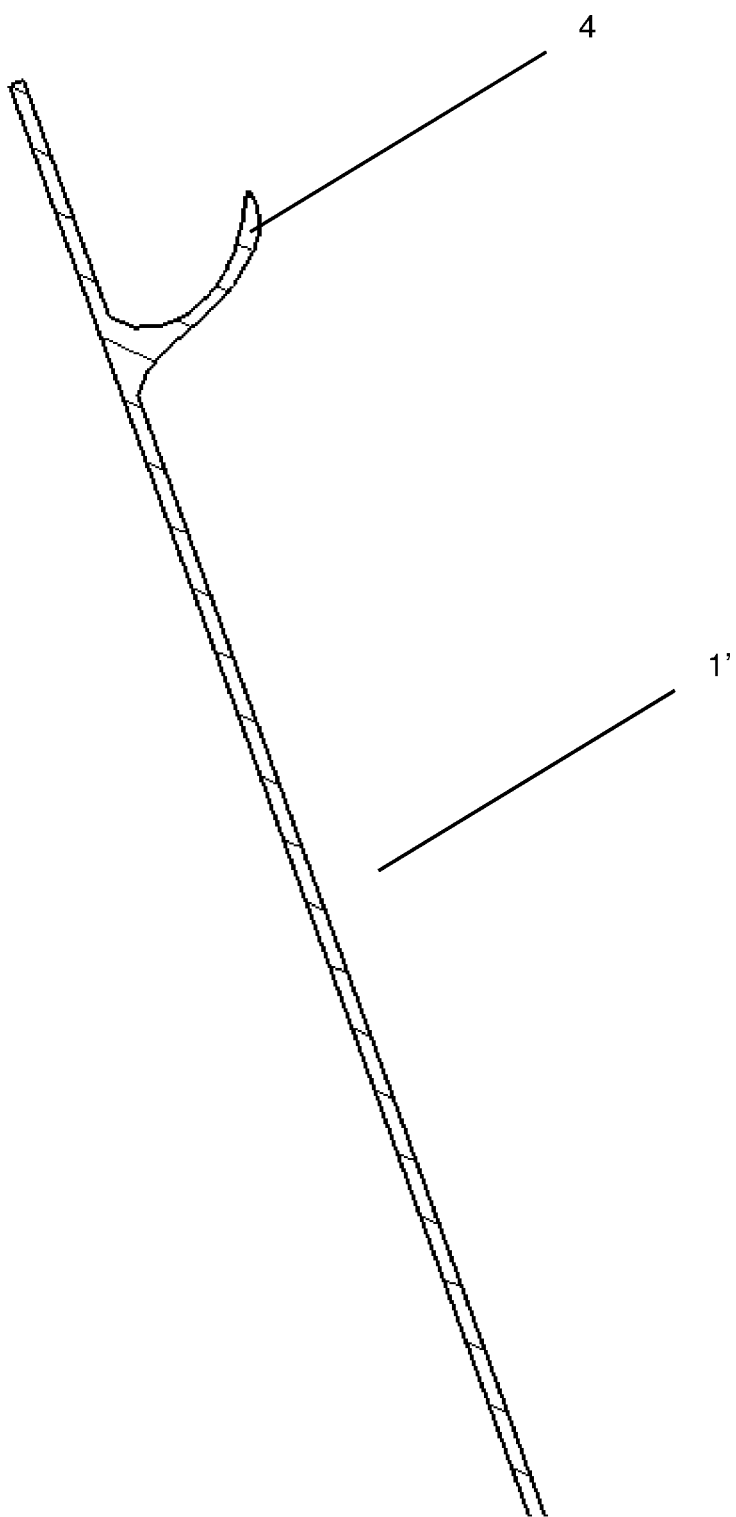

FIG. 5 displays a cross-sectional view of a shell with a hook, which may be used in a method of the invention.

Figure 6:
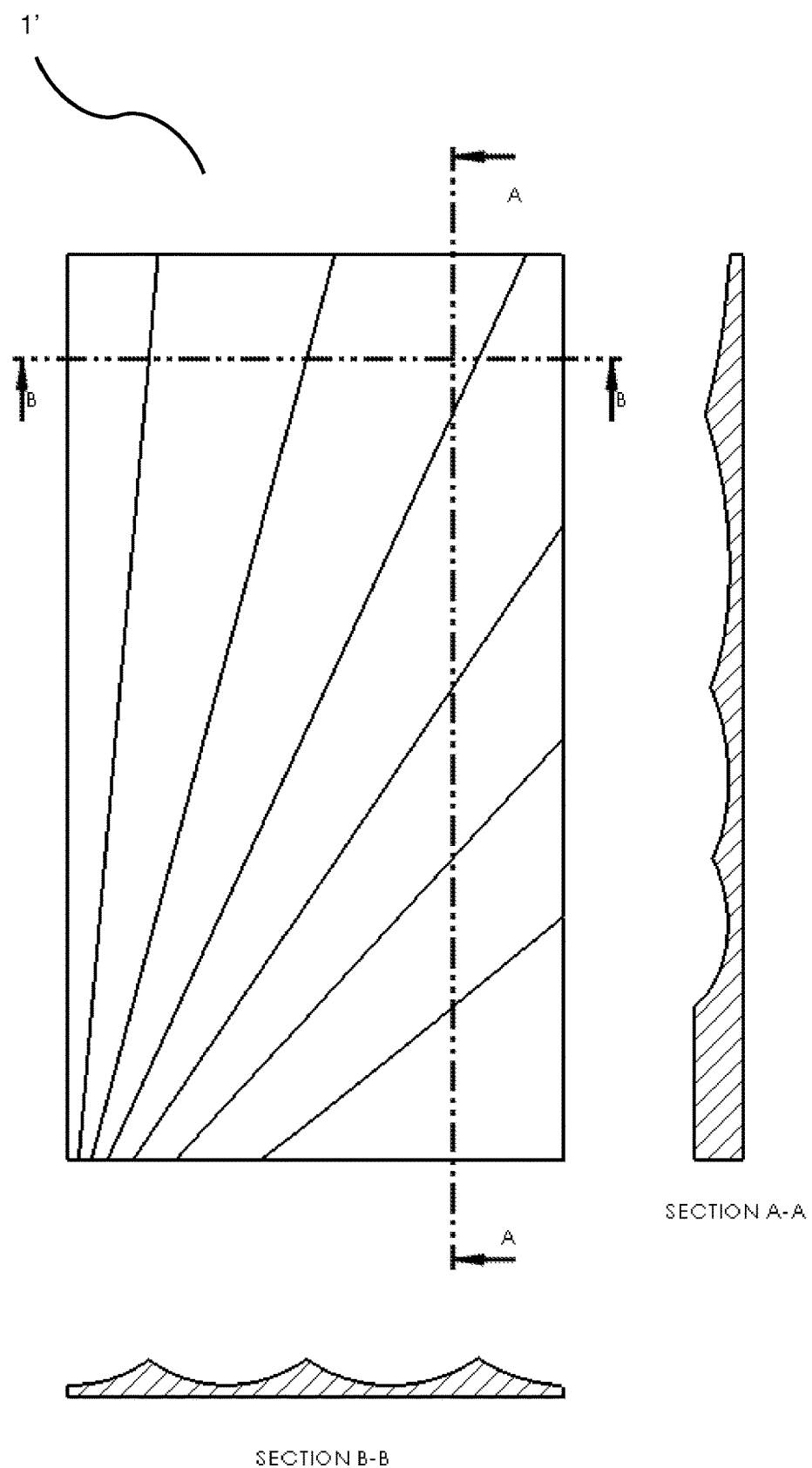

FIG. 6 displays a shell with a functional surface and two cross sections, which may be used in a method of the invention.

Figure 7:
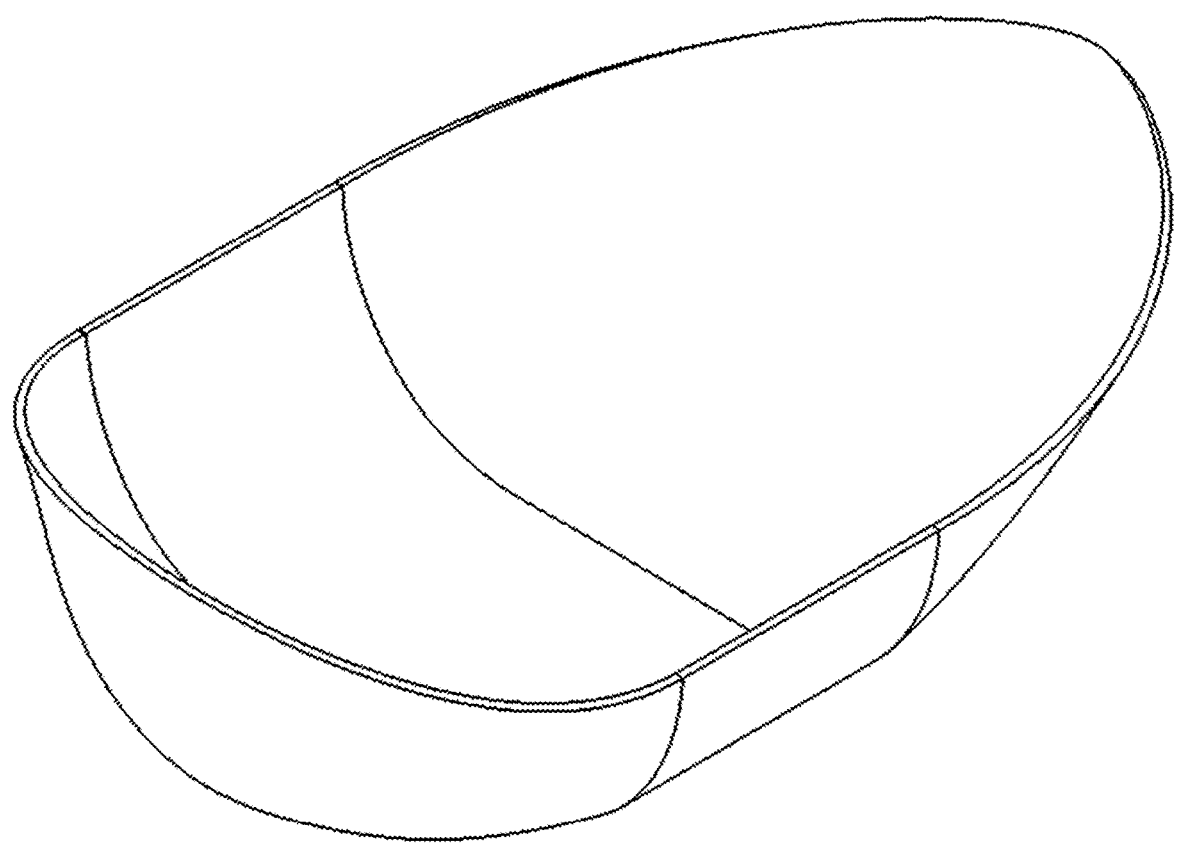

FIG. 7 displays three-dimensional view of a shell, shaped like the hull of a boat, which may be used in a method of the invention.

An article produced by a method of the invention is as such fiber-reinforced and comprises a surface layer of a material that is not fiber-reinforced. The surface layer usually adheres to a surface of the article, and is usually not easy to remove therefrom. It is for example not the intention that it releases from the article during use. In a method of the invention, the surface layer is first prepared as a separate item (i.e. the shell), after which the article is attached to it, thereby adapting the shape of the particular surface of the shell to which it becomes attached. After attachment, the shell has become a layer of a material that is present on at least part of the surface of the article. The surface layer is usually present on an outer surface of the article, but may also be present on an inner surface of the article. Due the presence of the surface layer, the appearance of the article is governed by the nature of the surface layer. When present at the outside of the article, it determines the exterior view, and when present at the inside, it determines the interior view.

The exact geometry of the article at the interface between the article and the surface layer may be different from the geometry of the surface layer on top of it (i.e. the interface between the surface layer and air). In other words, the two main surfaces of the shell do not need to be exactly the same. For example because the shell does not have a uniform thickness, or because one of its two main surfaces has a particular surface texture or comprises a particular three-dimensional functionality such as attachment means. Usually, the two surfaces have a similar shape and/or a similar curvature.

In a method of the invention, a surface of the shell corresponds in negative relief to a surface of the final article. For the purpose of the present invention, such surface of the shell will be termed "the surface of the shell that is in negative relief". The surface is in negative relief because the curable resin with reinforcement fibers adopts the shape of the shell's surface during its application to that surface. When the curable resin is finally cured, the article is formed with the shell attached to it. As a result, the covered surface of the shell is the negative of the covered surface of the article. The resulting composition of the article and the shell can now be regarded as an article having a surface layer.

Thus, the shell dictates (at least part of) the shape of the final article, since it is this shape that is adapted by the curable resin that is applied thereto. For practical reasons, only part of the article is usually shaped by the free-standing shape. Some sides of the article are preferably at an interface with the atmosphere, otherwise there is not enough space to apply the curable composite.

FIGS. 1 and 2 each display an article (2) produced by a method of the invention. The article (2) as such is fiber-reinforced and comprises a surface layer (1) of a material that is not fiber-reinforced. In FIG. 1, the article (2) and the surface layer (1) are curved. In FIG. 2, the article (2) and the surface layer (1) are flat.

By an additive manufacturing technique is meant a technique wherein 3D objects are manufactured by an additive process in which successive layers of material are laid down under computer control. These objects can be of almost any shape or geometry, and are produced from a 3D model or an electronic data source. Additive manufacturing techniques are known in the art. In a method of the invention, an AM technique usually makes use of the extrusion of thermoplastic material, the sintering or melting of a granular material or the curing of a curable resin. An AM technique is in particular selected from the group of fused deposition modeling (FDM), fused filament fabrication (FFF), selective heat sintering (SHS), selective laser sintering (SLS), selective laser melting (SLM), stereolithography (SLA), digital light processing (DLP), and continuous liquid interface production (CLIP).

An advantage of the invention is that a fiber-reinforced resin can be obtained in a desired shape without the use of a mold. AM methods usually do not allow to manufacture a shaped article of a matrix material containing long and/or continuous fibers. For such materials, a mold is often used. A method of the invention, however, provides the possibility to form a shaped article of a matrix material containing continuous fibers without the use of a mold. On the other hand, the method still benefits from the AM technology, since the shell is indeed prepared by 3D printing. Another advantage of the method is that a product can be obtained having a very well-defined outer surface (i.e. at the interface with air), because it is prepared by 3D printing. In this way, there is no need to apply after-treatments such as cutting, scraping, smoothening, sanding, engraving or polishing.

It is an advantage of a method of the invention is that no mold is required for manufacturing the fiber-reinforced article. This is not only because it is costly and laborious to prepare a mold, but also because fibers are often damaged when filling a mold. The most common damage to fibers when filling a mold is the interruption of their continuity, which imparts the quality of the final product.

By a material that is not fiber-reinforced is meant a material that is essentially not reinforced by any of short, long and continuous fibers. In essence, such material does not contain any of short fibers (i.e. fibers of in particular 10 mm or more), long fibers (i.e. fibers of in particular 50 mm or more) and continuous fibers (i.e. fibers throughout the entire product). It is possible, however, that such material comprises microfibers. Microfibers are fibers with a length of less than 1 mm, and can be applied in conventional AM techniques.

A fiber-reinforced article produced by a method of the invention is made of a fiber-reinforced material. By a material that is fiber-reinforced is meant a material that is reinforced by fibers selected from the group of short fibers (2-10 mm), long fibers (up to 50 mm) and continuous fibers.

The fibers applied in a method of the invention are usually at least 5 mm. They may be 10 mm or more, 15 mm or more, 20 mm or more, 25 mm or more, 35 mm or more, 50 mm or more, 65 mm or more, 80 mm or more, 100 mm or more, 125 mm or more, 150 mm or more, 175 mm or more, 200 mm or more, 250 mm or more, 500 mm or more or 1,000 mm or more. The fibers may also be continuous fibers.

The aspect ratio (defined as the ratio of fiber length to fiber diameter) of fibers applied in a method of the invention is usually at least 10. It may be 20 or more, 50 or more, 100 or more, 200 or more, 500 or more or 1,000 or more.

The fibers that may be used in a method of the invention may in principle be any fiber that is suitable for a particular material. In the invention, the fiber may be selected from the group of glass fiber, carbon fiber (also known as graphite fiber), aramid fiber, polyethylene fiber (in particular ultra-high molecular weight polyethylene (UHMWPE) fiber), polypropylene fiber, nylon fiber, polyester fiber, boron fiber, and combinations thereof.

The shell is typically an object that has one dimension that is substantially smaller than the other two dimensions. These two larger dimensions, the sizes of which are typically within the same order of magnitude, define the main surfaces of the shell, the one substantially smaller dimension its thickness. Usually, the shell has two main surfaces, one surface at each side of the shell. The surfaces usually have approximately the same surface area. In case the shell is flat and smooth, the surfaces in principle have the same surface area. In case the shell is curved (thus having an outer surface and an inner surface) and/or when the shell has a variation in thickness, the surface areas may differ. For example, due to curvature of the shell, one surface of the shell (e.g. the outer surface) may have a larger surface area than the other surface (e.g. the inner surface). Further, one or more much smaller surfaces may be present at the periphery of the shell, which in particular connect the two main surfaces. They may be substantially perpendicular to the main surfaces but they may also be at an oblique angle (an acute angle or an obtuse angle).

A shell (1') with a particular shape and surface structure is displayed in FIG. 6 (the top view being on the upper left, and the cross-sectional views below and on the right). This shell has a flat surface (on its down side) and a surface with a particular texture (on its top side). In this case, the flat surface is the surface in negative relief to which the resin becomes attached in a method of the invention. The textured surface remains at the interface with air and has the particular functionality that it contains gutters that all lead to the same corner of the shell. An article with this functionality may found application as a roof plate which drains all the rainwater to the same point.

In specific cases, the two substantially larger dimensions of the shell may have lengths that are not within the same order of magnitude. In such cases, the shell is of an elongated form, e.g. rod-like. Such a form may also have a certain curvature of the surface, or a certain surface structure. For example, in case it contains a trench that runs in parallel to the longest dimension, then the article according to the invention is gutter-like. Rod-like or tube-like articles produced by the method of the invention may be used to produce bicycle frames.

Another particular application is in the production of tubes for transport of fluids (liquid or gaseous). The 3D-printed shell then forms the inner part of the tube. Its outer surface would then be the surface in negative relief to which the fiber-reinforced is laminated, while its inner surface is a well-defined surface as can typically obtained by 3D-printing. In this application for tubes, the advantage of the method of the invention is that a surface with a particular pattern or profile can be realized in the inside of a tube. Such a surface can be designed to have the effect that it increases the flow properties of a fluid that is guided through the tube, such as a better laminar flow. The thickness of the shell may vary from one location to another, but usually the thinnest location of the shell is less than 5 times thinner than the thickest location of the shell. The average thickness of the shell is the average of the thicknesses at all locations of the shell. In case the shell has a substantially uniform thickness, then average thickness may be indicated by the term thickness.

The thickness (or the average thickness) of the shell may be defined relative to the size of one of the two main surfaces of the shell. For example, the thickness (or the average thickness) of the shell in meters may be at least 100 times smaller than the surface area of one of the two main surfaces of the shell in square meters (i.e. the smallest or the largest surface). It may also be at least 200 times smaller, at least 500 times smaller, at least 1,000 times smaller, 2,000 times smaller, at least 5,000 times smaller, at least 10,000 times smaller, at least 20,000 times smaller, at least 50,000 times smaller, at least 100,000 times smaller, at least 200,000 times smaller, at least 500,000 times smaller, at least 1,000,000 times smaller, at least 2,000,000 times smaller, at least 5,000,000 times smaller, at least 10,000,000 times smaller, at least 20,000,000 times smaller, at least 50,000,000 times smaller or at least 100,000,000 times smaller. For example, for a surface of 1 square meter and a shell thickness of 10 mm (0.01 m), the above factor is 100. It is 1,000 for a thickness of 1 mm (0.001 m) and it is 10,000 for a thickness of 0.1 mm (0.0001 m).

Alternatively, the thickness (or the average thickness) of the shell may be defined relative to the size of the longest or shortest dimension of the shell. For example, the thickness (or the average thickness) of the shell is 10% or less of the longest or shortest dimension of the shell, 5% or less of the longest or shortest dimension of the shell, 1% or less of the longest or shortest dimension of the shell, 0.5% or less of the longest or shortest dimension of the shell, 0.1% or less of the longest or shortest dimension of the shell, 0.05% or less of the longest or shortest dimension of the shell or 0.01% or less of the longest or shortest dimension of the shell. For example, when the longest (or shortest) dimension is 1 meter, then the thickness (or the average thickness) would be 10 mm in the case the above factor is 1%, the thickness (or the average thickness) would be 1 mm in the case of 0.1% and the thickness (or the average thickness) would be 0.1 mm in the case of 0.01%.

The thickness (or the average thickness) of the shell may in principle have any value. Usually, the thickness (or the average thickness) is in the range of 0.1-5 mm, in particular in the range of 0.2-2.5 mm. It is for example 20 mm or less, 15 mm or less, 10 mm or less, 7 mm or less, 5 mm or less, 4 mm or less, 3 mm or less, 2 mm or less, 1 mm or less, 0.7 mm or less, 0.5 mm or less or 0.3 mm or less. It is for example 0.2 mm or more, 0.5 mm or more, 1 mm or more, 2 mm or more, 5 mm or more or 10 mm or more.

In many conventional processes, it is desired to provide a thicker layer rather than a thinner layer on a fiber-reinforced article, but to accomplish this is often associated with disadvantages, e.g. because it is a difficult, lengthy, inefficient and/or costly process). In a process of the invention, however, the application of a thicker layer is much easier. The surface layer provided in a process from the invention can be as thick as is required for the specific application of the manufactured product. In this way, additional protection of the fiber-reinforced article can be realized by providing it with a thicker surface layer.

In view of the possible shapes and geometry a shell of the invention may have, it may also be considered as a cone, bowl, a dish, a disc, a sheet, a plate, or a panel. A shell may also contain an opening or a hole. It may for example have a tube-like or a ring-like shape. It may also have the shape of an open cone. When the shell is not flat, an outer surface and an inner surface may be defined. When the shell is of an elongated form, it may also be considered as a bar, a rod, a stick, a gutter, or a cylinder.

Since the shell (in particular one of its surfaces) initially is a separate structure that defines the shape of at least part of the final article in a method of the invention, it is preferred that the shell has some (preferably high) structural integrity and does not significantly deform or deflect due to gravity and/or due to the application of the fibers and the curable resin onto one of its surfaces. It is thus preferred that the shell has a rigid structure, or that it is at least sufficiently rigid so as to ensure that it does not deform to an unacceptable extent in a process of the invention. It may for example be less rigid as long as this can be accommodated for when it is supported by some supporting means (as will be further elaborated hereinbelow).

For example, the distance between any two points of the shape changes 5% or less (i.e. increases or decreases) when the shell is placed in different positions on a surface (e.g. when its position is changed from lying to standing, or when it is placed upside down) and/or during the handling that is necessary for applying the fibers and the curable resin. Preferably, it changes 3% or less, more preferably 2% or less, and even more preferably 1% or less. Most preferably, the shell is so rigid that it essentially does not deform under the action of gravity and/or during the handling that is necessary for applying the fibers and the curable resin.

Preferably, the shell is a free-standing shell. By this is meant that the shell does not need to be attached to or supported by another structure for retaining its intended shape. It is however possible, that supporting means are present to keep the shell in the intended shape, in particular during the application of the fibers and the curable resin and the curing thereof (i.e. during steps 2) and 3) of the method of the invention). In this way, the formed article is prepared with the intended shape. For example, support bars or even a support framework may be printed in connection with the shell. Such support means may be loosely attached to the shell so as to allow their easy removal after the formation of the article (i.e. after the curing). It is also possible to print the shell with the inclusion of one or more objects of a pre-manufactured material so that these objects are at least party incorporated into the shell and may serve as ribs or support bars that provide a higher initial stiffness to the printed shell. Such objects are preferably transparent to the applied (UV) radiation used in the 3D printing process, so that the curing of the printed material is not impaired.

Alternatively, the shell may be placed onto a supporting surface of a powderous substance such as sand, wherein that surface has adopted the shape of the shell so that it can in principle support any point of the shell's surface.

The shell may in principle be made of any material that is suitable for use in an AM technique for the manufacture of a three-dimensional product. The shell is in particular made of, or comprises, a material selected from the group of thermoset materials, thermoplastic materials, ceramics, metals and alloys.

The curable resin may in principle be any resin that can be shaped in a particular form, which form becomes permanent upon curing. The ability of a resin to be cured results from the presence of one or more curable chemical compounds in the resin. A curable chemical compound comprises one or more curable functionalities, which may be selected from the group of aliphatic epoxy, glycidyl ether, cycloaliphatic epoxy, hydroxyl, oxetane, vinyl ether, propenyl ether, crotyl ether, styrenic, acrylate, methacrylate, itaconate, maleimide, maleate, fumarate, cinnamate, acrylamide, methacrylamide, chalcone, thiol, allyl, alkenyl, and cycloalkenyl groups.

Usually, the curable resin is a light-curable resin, in particular a UV-curable resin or a thermally curable resin. For example, a light-curable resin comprises an epoxy resin, a polyester resin, a vinylester resin, an acrylate resin, a polyurethane resin, a phenolic resin, a furane resin, a dicyclopentadiene (DCPD) resin or any mixture thereof. For example, a thermally curable resin is a resin selected from the group of epoxy resin, polyester resin, vinylester resin, acrylate resin, polyurethane resin, phenolic resin, furane resin, dicyclopentadiene (DCPD) resin or any mixture thereof. The curing of the resin in a method of the invention usually occurs under the influence of radiation and/or heat.

As already stated hereinabove, when the curable resin is finally cured, the article is formed with the shell attached to it. The shell and the article typically adhere to each other, by which is meant that a force is needed to separate both parts. For example, the force is 0.1 MPa or more, 0.2 MPa or more, 0.5 MPa or more, 1 MPa or more, 2 MPa or more, 5 MPa or more, 10 MPa or more, 20 MPa or more, 50 MPa or more or 100 MPa or more, measured according to ASTM D4541.

Usually, this is a physical adherence, but in special cases there may also be a chemical bonding between the shell and the article. For example, the shell may comprise an incompletely cured resin, which is further cured during step 3) of the method. One way of obtaining the shell with an incompletely cured resin is by using a heat and/or UV curable resin to prepare the shell via AM, wherein the AM process is carried out such that not all curable functionalities are cured. This may be performed by adjusting the energy input used for the curing during the AM, or by shortening or completely omitting a post-curing step after the shell has been prepared by AM. A post-curing step is known in the art and commonly applied in processes wherein a curable resin is cured, to reach a higher degree of curing, or a complete curing.

In step 2) of such embodiment of the invention, the curable resin is contacted with the surface of a shell that comprises an incompletely cured material, i.e. a shell that comprises a material that further hardens by exposure to heat or light. Since the curable resin as well as the shell comprises chemical groups that are uncured, a chemical bonding between the two components is achieved when uncured chemical groups of both components are cured in each other's proximity.

Thus, in step 1) of such embodiment of the invention, a shell is prepared that comprises an incompletely cured resin. This means that at least part of the curable functionalities remains uncured after the shell has been formed by an AM technique. The additive manufacturing technique that is used in such case preferably makes use of the curing of a curable resin. An AM technique that may be used is known under the name stereolithography (SLA), digital light processing (DLP) or continuous liquid interface production (CLIP). The AM technique is then carried out in such a way that at least part of the curable functionalities remains uncured. Because of the preferred rigidity of the shell (as described hereinabove), the curable resin is preferably cured for at least 50%. This means that at least 50% of the available curable functionalities of the curable resin are actually cured, and that step 1) yields a shell wherein the content of curable functionalities is less than 50% of the amount of curable functionalities originally present in the curable resin. When an incompletely cured shell is prepared in step 1), the content of uncured functionalities may be 40% or lower, 30% or lower, 25% or lower, 20% or lower, 15% or lower, 10% or lower, 8% or lower, 6% or lower, 5% or lower, 4% or lower, 3% or lower, 2% or lower, 1% or lower or 0.5% or lower. The content may be in the range of 1-40%, in the range of 2-30% or in the range of 3-20%.

The application of curable resin on a shell with an incompletely cured resin may at first sight be illogical, since such shell would likely have an insufficient structural integrity, it would e.g. be too floppy and easily deform under its own weight and/or during further handling of the shell. Another disadvantageous effect that can be foreseen is that the material and/or the shape of the shell would be impaired by the interaction with the resin, because of partial dissolution of the shell in the resin and/or too much absorption of resin into the shell so that the shell relaxes, widens, expands or otherwise loses its initial shape. This, however, appeared not to be the case when the content of uncured functionalities was 50% or lower, in particular not when it was 20% or lower. The method of the invention surprisingly appeared to yield articles with a surface layer that has a sufficient or even increased adhesion to the article, in combination with a very high dimensional accuracy, i.e. the final article had the desired dimensions, with only very small deviations from the dimensions of the model as programmed in the computer software for the 3D printing (see also the Examples).

Further, a better adhesion between the article and the shell means that higher forces acting on the article can be absorbed. These may be forces due to the impact of an external object (i.e. the article has a higher impact resistance) or due to tensions between the article and the shell as a result of changes in temperatures.

In particular, the product was found to be less prone to delamination on the longer term, in particular it has a higher resistance against weathering (exposure to water, salt, (UV) light, extreme temperatures and the like).

A process of the invention wherein a shell with an incompletely cured resin is used exhibits the above advantages in combination with the advantages of 3D printing, which are e.g. the advantages that no mold is used, that there is more control over the inclusion of fibers into the article (e.g. no damage to and a better positioning of the fibers), and that there are more possibilities with regard to the shape of the article.

The content of uncured functionalities (the degree of curing) in a 3D printed shell can be determined by conventional methods known to the skilled person, for example spectroscopic methods that rely on the absorption of electromagnetic radiation of the applied curable (and cured) functionalities, such as absorption in the infrared region.

In a particular embodiment, two shells are prepared via an additive manufacturing technique, which is either followed by squeezing a mixture of the curable resin and the reinforcement fibers between the two shells or by bringing only the reinforcement fibers between the two shells and using a resin infusion technique to introduce the resin between the two shells, in particular vacuum-assisted resin infusion. The resulting composite of resin and fibers between the two shells is subsequently cured to form a fiber-reinforced article that is sandwiched between two layers of a material that is not fiber-reinforced. Accordingly, the invention further relates to a method comprising the steps of
1) preparing a first and a second shell via an additive manufacturing technique, both shells
being of a material that is not fiber-reinforced; and
having a surface that corresponds in negative relief to a surface of the article formed in step 3); thereafter 2a) applying
long and/or continuous reinforcement fibers; and
a curable resin
to the surface of the first shell that is in negative relief, to form a mixture of curable resin and long and/or continuous reinforcement fibers on the surface of the first shell, so that the surface of the mixture contacting the first shell adopts the shape of the surface of the first shell that is in negative relief; thereafter
2b) applying the surface of the second shell that is in negative relief to a surface of the mixture, so that the surface of the mixture adopts the shape of the surface of the second shell that is in negative relief; thereafter
3) curing the curable resin to form a fiber-reinforced article having attached to two of its surfaces a layer of a material that is not fiber-reinforced.

In the alternative way, the fibers and the resin are introduced separately and subsequently between the two shells. This means that in step 2) of this method firstly only the fibers are placed onto the surface of the first shell, secondly the second shell is placed on top of the first shell to leave a space in between both shells, and thirdly the resin is introduced into that space by a resin infusion technique to form the uncured mixture of fibers and resin between both shells. Accordingly, step 2) of the method may then be substituted for a different step, which step comprises:
2a) applying long and/or continuous reinforcement fibers to the surface of the first shell that is in negative relief; thereafter
2b) placing the surface of the second shell that is in negative relief above the surface comprising the fibers to create a space between both shells comprising the fibers; thereafter
2c) introducing the curable resin into the space to form a mixture of curable resin and long and/or continuous reinforcement fibers that is present in the space, so that the surfaces of the mixture contacting the first and the second shell adopt the shape of the surface of each of the shells that is in negative relief.

In an embodiment, both shells have corresponding shapes, in particular corresponding three-dimensional shapes, which means that they can fit into each other and/or may be stacked. This may in particular mean that a relative arrangement of both shells is possible wherein there is a constant spacing between them. In this way, a fiber-reinforced article may be manufactured that has a uniform thickness and that has a surface layer on either side of a material that is not fiber-reinforced.

In a preferred embodiment, one or both shells are provided with protrusions on the surface(s) that is (are) in negative relief, which protrusions can act as spacers when the shells are pressed together in a method of the invention. The function of such spacers is to effect a certain relative arrangement of both shells, wherein the spacers create the desired space between the shells and prevent that the surfaces of the two shells unintentionally touch each other. In a particular embodiment, the shells are provided with corresponding (or interrelating) protrusions and indentations, by which an even more accurate relative positioning of both shells can be reached.

In another preferred embodiment, both shells are cylinders, wherein one of the cylinders fits into the other. This would allow the manufacture of special pipes suitable for liquids (see e.g. FIG. 5).

FIG. 3 displays a three-dimensional view of a shell (1') comprising spacers (3), wherein the shell is not (yet) attached to an article. FIG. 4 displays a cross-section of an article (2) that is prepared from two shells (1'), one of which comprising spacers (3). Attached to the prepared article are two surface layers (1) which are separated by spacers (3). The space in between both surface layers comprises the fiber-reinforced article.

This method that makes use of two shells advantageously yields a strong fiber-reinforced product that has almost all of its surface area covered with a layer of material that has been obtained by an additive manufacturing technique.

In a more particular embodiment, one or both shells comprise an incompletely cured resin, which is further cured during step 3). In this way, an even stronger product may be obtained.

Besides by the physical and chemical bonding as described hereinabove, it is also possible to improve the adherence between the shell and the article by structural bonding. For example, the surface of the shell that is in negative relief may be equipped with particular three-dimensional shapes, e.g. protrusions, indentations or rings. In particular, the protrusions are smaller at the base (i.e. at the connection to the shell) than at the terminus, so that the protrusions can be locked in by the resin surrounding the protrusions. When the resin in the method of the invention flows over the surface, narrowly following the contours of these shapes, then solid material resulting from the curing of the resin is tightly surrounding these shapes. This provides increased adherence between the shell and the article.

Thus, in an advantageous embodiment, the surface of the shell that is in negative relief comprises structural elements that improve the adhesion between the shell and the article. In conventional production techniques, it is often difficult to provide such structural elements on a surface, especially when the structural elements comprise complex shapes, have a high repetition and/or when there is a desire to optimize the shape of the elements in a development process. Since the shell in a method of the invention is obtained via an additive manufacturing technique, it is easy to provide the surface with any structural element of any shape, on any scale and in any possible amount. Therefore, a method of the invention is particularly advantageous for making a composite of a fiber-reinforced article and a layer that is not fiber-reinforced, especially when a high adherence between the article and the layer is desired.

Accordingly, the invention further relates to a fiber-reinforced article, having attached to at least part of its surface a layer of a material that is not fiber-reinforced, wherein the surface of the layer at the interface between the article and the layer comprises protrusions and/or indentations, and wherein the surface of the article at the interface between the article and the layer comprises the protrusions and/or indentations in negative relief. In particular, the protrusions at the layer (or at the article, respectively) are smaller at the base than at the terminus, so that the protrusions are locked in by the material of the article (or of the layer, respectively) surrounding the protrusions. In this way, a structural adherence between the layer and the article is obtained.

In a particular embodiment, the fiber-reinforced article is sandwiched between two layers of a material that is not fiber-reinforced, wherein the surface of both layers at the interfaces between the article and the layers comprises protrusions and/or indentations, and wherein the surfaces of the article at the interfaces between the article and the layers comprise the protrusions and/or indentations in negative relief.

When applying a resin with reinforcement fibers onto a surface, a known practice is to first apply the dry fibers and only thereafter the resin. This is for example useful when control over the position or orientation of the fibers is important, which is in particular the case when a high strength and a high stiffness of the fiber reinforced material are desired. In such cases, it is advantageous that the fibers have a fixed position and are distributed evenly on the surface that is provided with the fiber reinforced material, and do not easily slide away. Furthermore, in the case of curved surfaces, it is advantageous if the fibers can follow the curvature of the surface. In such cases, it is thus desired that such surface comprises means for immobilizing the fibers such as pins, hooks, clamps, eyes, holes, bars, gullies, conduits or tunnels. An additional advantage emerges when the fibers are hold in place and cannot release from the means for immobilizing without breaking the fibers. This is for example the case when fibers penetrate through a hole that is defined by a closed shape such as an eye or a hole. Since (after the curing) the fibers are also incorporated in the cured resin, an enhanced adherence between the article and the layer is accomplished with such means for immobilization.

Thus, in an advantageous embodiment, the surface of the shell that is in negative relief comprises means for immobilizing the long and/or continuous reinforcement fibers.

FIG. 5 displays a cross-sectional view of a shell (1') with means (4) for immobilizing the fibers. The means comprises a hook (4).

In conventional production techniques, it is often difficult to provide such means on a surface, especially when the structural elements comprise complex shapes, have a high repetition and/or when there is a desire to optimize the shape of the elements in a development process. Since the shell in a method of the invention is obtained via an additive manufacturing technique, it is easy to provide the surface with any structural element of any shape, on any scale and in any possible amount. Therefore, a method of the invention is particularly advantageous for making a composite of a fiber-reinforced article and a layer that is not fiber-reinforced, especially when it is desired to have an accurate positioning of the fibers and/or a high adherence between the article and the layer.

The invention further relates to a fiber-reinforced article obtainable by any of the methods described hereinabove. In a particular embodiment, the fiber-reinforced article is sandwiched between two layers of a material that is not fiber-reinforced.

An article obtained by a process of the invention can in principle be applied in any situation where there is a desire for a fiber-reinforced article with a well-defined (i.e. 3D-printed) surface. Particular applications are those where a high strength or impact resistance is desired, in combination with a relatively low mass of the article and/or a desire for a customized surface. Therefore, many applications are found in vehicles, for example as a panel in the bodywork of a vehicle such as a door, a (car) hood or a wing. In particular, the invention opens the door to easy replication of bodywork panels by scanning panels that need replacement, followed by manufacturing them with a process of the invention. This is in particular useful for old-timer restoration, for which original parts are scarcely available. Another advantage of the invention is that the bodywork of a vehicle can be provided with extra functionality in structure, such as shark-skin effects on the outer hull of a (sailing) boat.

Also domestic applications often require strength in combination with nice visual appearance. In particular, the sandwich structure wherein the reinforced part is covered by a 3D-printed surface on either side may be used in a domestic door. Yet another application of a product obtained by the method of the invention is the use in swimming pools, such as as wall or bottom panels of a swimming pool.

Accordingly, the invention further relates to a vehicle comprising a fiber-reinforced article as described hereinabove, wherein the vehicle is in particular a vehicle selected from the group of boats, cars, motorbikes, aerial vehicles and space vehicles.

EXAMPLES

Materials and Methods

Use was made of the following experimental procedures.

1) Printing the Shell

A 3D model of the shell was drafted and exported as an .STL file by making use of the computer software Solidworks 2015. This model was then imported in equipment specific software to produce sliced images. The shell was subsequently 3D-printed by an Atum 3D DLP printer with a step thickness of 0.1 mm. The material applied by the printer was Makerjuice G+ resin, which is an acrylic ester-based resin with a photoinitiator. After printing, the shell was removed from the printer and excess resin was removed with a dry cloth.

The tensile test samples were printed as "dogbones", either with layers perpendicular to the longest dimension (characterized by "0 degrees" in Table 1), or with layers parallel to the longest dimension (characterized by "90 degrees" in Table 1). The tensile strength of some samples was tested without the samples being subjected to post-curing (i.e. the tensile strength was measured "as printed"). After the printing, these samples were protected against further exposure to (ambient) light by wrapping them in paper, to prevent further curing.

2) Preparing the Fiber-Reinforced Article

First, resin was applied to the inner surface of the printed shell. The resin used was vinylester resin (Atlac 580 ACT, produced by DSM). The curing of this resin was initiated with 2% butanox M50. Next, fibre layers of [+/−45] 300 gsm E-glass were roughly cut to shape and were applied by hand laminating as four layers. Standard hand laminating tools were used to apply the fibre layers, thereby minimizing air entrapments.

3) Curing the Curable Resin

The intermediate product was left to cure at room temperature (20° C.) during 24 hours, yielding the fiber-reinforced article wherein uncured functionalities are present (characterized by "not-postcured" in Table 1). In an alternative method, the resulting product was post-cured (characterized by "post-cured" in Table 1) by placing it in a UV chamber at room temperature for two hours (one hour illumination on each side).

The resulting products of this process had an accurately defined outer shape in combination with the structural properties of a normal composite product.

Results

1. Effect of Degree of Curing and Direction on Tensile Strength

To investigate the tensile strength of only the printed shells (i.e. without the fiber-reinforced material attached to it), the shells were 3D-printed as bars (dogbones) and their tensile properties were evaluated according to ISO527 (specimen type 5A). The obtained results are shown in Table 1.

TABLE 1

Tensile properties of the prepared shells

|  | Strain at break | | Yield stress | | Stress at break | | Modulus (est.) |
| --- | --- | --- | --- | --- | --- | --- | --- |
|  | % | StDev | MPa | StDev | MPa | StDev | GPa |
| Not postcured, 90 deg | 9.3 | 3.2% | 24.9 | 0.9 | 25.2 | 0.5 | 26.9 |
| Postcured, 90 deg | 4.2 | 0.9% | 35.8 | 0.5 | 35.8 | 0.5 | 84.4 |
| Postcured, 0 deg | 4.8 | 0.6% | 36.9 | 1.5 | 36.9 | 1.5 | 77.4 |

Table 1 demonstrates that a post-cured bar is stronger than when no post-curing step was applied. It can thus be concluded that post-curing has a significant effect on the tensile properties. A likely explanation is that the conversion of the resin in the shell is less than 100% during the printing of the shell, and that the curing reaction of the unreacted functionalities goes to completion whereby the tensile strength is increased.

Another important observation is that the strength of the printed bar is not significantly influenced by the direction of printing. This means that there is a high layer-to-layer strength.

It can also be concluded that the strain at break is significantly higher than that of most fiber-reinforced articles (which have usually values of 2-2.5%). This means, that when a composite of the shell with a fiber-reinforced article is made, the composite (i.e. the article) can be expected to fail earlier than the surface (i.e. the shell) when under load, which is preferable.

It is to be noted that the yield stress of the 3D-printed bar is 36 MPa, while that of a fiber-reinforced material is usually in the range of 400-1200 MPa. Thus, with a method of the invention, 3D-printed parts can be strengthened.

2. Assessment on the Pull-Off Strength of the Surface Layer

A second test that has been performed is an assessment on the pull-off strength of the surface layer (i.e. of the shell). This effectively determines the adhesion of the fiber-reinforced article to the printed shell. A high adhesion is required for a longevity of the bond. A circular dolly is bonded to the printed surface layer. After cure of the adhesive, a drillbit is used to drill though the printed layer, effectively to ensure the only bonded area contributing to the measurement sits directly below the dolly. The results are displayed in Table 2. Herein, "post-cured" means that the printed shell is post-cured in UV for two hours before applying the curable resin and the fibers. By "sanded" is meant that the printed surface is sanded (roughened) before applying the composite.

TABLE 2

Tensile properties of the prepared fiber-reinforced articles

| | |
| --- | --- |
| Reference test (adhesive strength) | 3.7 MPa (average of 3) |
| Non-postcured - non-sanded | 2.7 MPa (average of 2) |
| Non-postcured - sanded | 3.0 MPa (average of 2) |
| Postcured - non-sanded | 2.4 MPa (average of 2) |

The reference test was performed with a dolly bonded to a standard composite panel to ensure the measured values truly reflect the interface strength between the shell and the article. All the measured values are indeed lower than that of the reference, which means the measurement reflects the interface strength between the shell and the article.

It can be seen that non-postcured samples perform better, which is a strong indication that unreacted/uncured functionalities in the shell form chemical bonds with the curable resin of the article. The measured values are well within range or above values typically seen for high-performance coatings and adhesives.

3. Manufacturing of the Fiber-Reinforced Hull of a Small Boat

The fiber-reinforced hull of a boat was prepared by making use of a method of the invention, according to the experimental procedures given above, wherein an incompletely cured shell was obtained. The exact 3D model of the (outer) shape of the hull was designed by making use of the computer software, and is displayed in FIG. 7. The outer surface layer of the hull (i.e. the shell in the method if the invention) was subsequently 3D-printed and the resin with fibers was hand laminated to the inner surface of the shell. After curing and post-curing, the fiber-reinforced hull was obtained.

The dimensional accuracy of the finished hull was determined by comparing it (using a Vernier calliper) with the computer model that was used as input. The highest variation was found to be 0.8%; one dimension modelled as 250 mm turned out to be 252 mm produced. In addition, the smooth 3D-printed surface did not require any further physical treatment such as shaping or polishing.

The invention claimed is:

1. A method for preparing a fiber-reinforced article having a surface and a layer of a material that is not fiber-reinforced attached to at least part of the surface, wherein the method comprises the consecutive steps of:
   1) preparing a shell via an additive manufacturing technique, wherein the shell (i) is formed of a material that is not fiber-reinforced, (ii) has a surface that corresponds in negative relief to a surface of the article formed in step 3), and (iii) comprises incompletely cured resin which is further cured during step 3);
   2) applying long and/or continuous reinforcement fibers and a curable resin to the surface of the shell that is in negative relief to thereby form a mixture of curable resin and long and/or continuous reinforcement fibers on the surface of the shell, so that the surface of the mixture contacting the shell adopts the shape of the surface of the shell that is in negative relief; and thereafter 3) curing the curable resin and the incompletely cured resin to form the fiber-reinforced article having a layer of a material that is not fiber-reinforced attached to at least part of the surface of the fiber-reinforced article.

2. The method according to claim 1, wherein the shell has an average thickness which is 10% or less of a longest dimension of the shell.

3. The method according to claim 1, wherein a distance between any two points of the shell changes 1% or less when the shell is placed in different positions on a surface and/or during handling that is necessary for applying the fibers and the curable resin.

4. The method according to claim 1, wherein step 1) comprises preparing the shell from a curable resin to provide the shell with a content of curable functionalities which is less than 50% of an amount of curable functionalities originally present in the curable resin.

5. The method according to claim 1, wherein the method comprises the consecutive steps of:

1) preparing a first shell and a second shell via an additive manufacturing technique, wherein both the first and second shells (i) are formed of a material that is not fiber-reinforced, (ii) have a surface that corresponds in negative relief to a surface of the article formed in step 3), and (iii) comprise incompletely cured resin which is further cured during step 3);
   2a) applying long and/or continuous reinforcement fibers and a curable resin to the surface of the first shell that is in negative relief to thereby form a mixture of curable resin and long and/or continuous reinforcement fibers on the surface of the first shell;
   2b) applying the surface of the second shell that is in negative relief to a surface of the mixture so that the surface of the mixture adopts the shape of the surface of the second shell that is in negative relief; and thereafter
   3) curing the curable resin and the incompletely cured resin to form a fiber-reinforced article having a layer of a material that is not fiber-reinforced attached to the surfaces of the first and second shells;

or wherein the method comprises the consecutive steps of:
   1) preparing a first shell and a second shell via an additive manufacturing technique, wherein both the first and second shells (i) are formed of a material that is not fiber-reinforced (ii) have a surface that corresponds in negative relief to a surface of the article formed in step 3), and (iii) comprise incompletely cured resin which is further cured during step 3);
   2a) applying long and/or continuous reinforcement fibers to the surface of the first shell that is in negative relief;
   2b) placing the surface of the second shell that is in negative relief above the surface comprising the fibers to create a space between both the first and second shells comprising the fibers;
   2c) introducing a curable resin into the space to form a mixture of curable resin and long and/or continuous reinforcement fibers that is present in the space so that the surfaces of the mixture contacting the first shell and the second shell adopt the shape of the surface of each of the first and second shells that is in negative relief; and thereafter
   3) curing the curable resin and the incompletely cured resin to form a fiber-reinforced article having a layer of a material that is not fiber-reinforced attached to the surfaces of the first and second shells.

6. The method according to claim 1, wherein the additive manufacturing technique is a technique that makes use of extrusion of thermoplastic material, sintering or melting of a granular material or curing of a curable resin.

7. The method according to claim 1, wherein the additive manufacturing technique is a technique selected from the group of fused deposition modeling, fused filament fabrication, selective heat sintering, selective laser sintering, selective laser melting, stereolithography and digital light processing.

8. The method according to claim 1, wherein the surface of the shell that is in negative relief comprises structural elements that improve adhesion between the shell and the article.

9. The method according to claim 4, wherein the content of curable functionalities in the shell is in a range of 3-20% of the amount of curable functionalities originally present in the curable resin.

* * * * *